United States Patent
Schuck et al.

(10) Patent No.: US 6,831,762 B2
(45) Date of Patent: Dec. 14, 2004

(54) SYSTEM AND METHOD FOR HOLOGRAPHIC STORAGE WITH OPTICAL FOLDING

(75) Inventors: Miller Schuck, Boulder, CO (US); Curt Shuman, Colorado Springs, CO (US); Aaron Wegner, Longmont, CO (US); Michael Tackitt, Lyons, CO (US)

(73) Assignee: InPhase Technologies, Inc., Longmont, CO (US)

( * ) Notice: Subject to any disclaimer, the term of this patent is extended or adjusted under 35 U.S.C. 154(b) by 8 days.

(21) Appl. No.: 10/256,797

(22) Filed: Sep. 27, 2002

(65) Prior Publication Data

US 2003/0156307 A1 Aug. 21, 2003

Related U.S. Application Data

(60) Provisional application No. 60/358,322, filed on Feb. 19, 2002.

(51) Int. Cl.$^7$ ................................................. G03H 1/16
(52) U.S. Cl. ........................... 359/29; 359/31; 359/32; 359/35; 365/216
(58) Field of Search ............................. 359/29–33, 35, 359/21, 24; 365/125, 216, 234

(56) References Cited

U.S. PATENT DOCUMENTS

| | | | |
|---|---|---|---|
| 3,615,123 A | 10/1971 | Wuerker | |
| 3,937,555 A | 2/1976 | Kurtz | |
| 4,478,481 A | 10/1984 | Fusek et al. | |
| 4,492,859 A | 1/1985 | Pruszenski, Jr. | |
| 4,714,309 A | 12/1987 | Woodcock et al. | |
| 4,806,728 A | 2/1989 | Salzer et al. | |
| 4,904,062 A | 2/1990 | Morishita et al. | |
| 4,968,108 A | * 11/1990 | Ikeda et al. | ................ 359/30 |
| 4,986,641 A | 1/1991 | Braat | |
| 5,311,364 A | 5/1994 | Kanoshima et al. | |
| 5,483,365 A | 1/1996 | Pu et al. | |
| 5,529,861 A | 6/1996 | Redfield | |
| 5,535,058 A | 7/1996 | Tanaka et al. | |
| 5,751,482 A | 5/1998 | Challener, IV | |
| 5,896,210 A | * 4/1999 | Redfield et al. | ............... 359/30 |
| 5,978,112 A | 11/1999 | Psaltis et al. | |
| 6,103,454 A | 8/2000 | Dhar et al. | |
| 6,104,511 A | 8/2000 | Hesselink et al. | |
| 6,157,473 A | 12/2000 | Jang et al. | |
| 6,204,975 B1 | 3/2001 | Watters et al. | |
| 6,252,686 B1 | 6/2001 | Ando | |
| 2003/0044577 A1 | 3/2003 | Dhar et al. | |
| 2003/0072045 A1 | 4/2003 | King et al. | |
| 2003/0112527 A1 | 6/2003 | Curtis et al. | |

FOREIGN PATENT DOCUMENTS

JP 2-153310 6/1990

OTHER PUBLICATIONS

Barbastathis, G and Psaltis, D. (2000). "Volume Holographic Multiplexing Methods," In *Holographic Data Storage*. H.J. Coufal et al. eds., Springer–Verlag., pp 21–62.
Barbastathis, G. et al. (1996). "Shift Multiplexing with Spherical Reference Waves," *Applied Optics* 35(14):2403–2417.

(List continued on next page.)

*Primary Examiner*—Leo Boutsikaris
(74) *Attorney, Agent, or Firm*—Morrison & Foerster LLP (57) ABSTRACT

A system for recording and reading out holograms in a storage medium including a pattern encoder, a first fourier transform lens with a focal length $f_1$, a second fourier transform lens with a focal length $f_2$, a detector array, and a first and second prism. The first prism is located between the pattern encoder and the first fourier transform lens, wherein the optical length between the pattern encoder and the first fourier transform lens through the first prism is equal to a back focal length $BFL_1$. The second prism located between the second fourier transform lens $f_2$ and the detector array, wherein the optical path length between the second fourier transform lens and the detector array through the second prism is equal to a back focal length $BFL_2$.

29 Claims, 7 Drawing Sheets

OTHER PUBLICATIONS

Chuang, E. and Psaltis, D. (1997). "Storage of 1000 Holograms with Use of a Dual–Wavelength Method," *Appl. Opt.* 36(32):8445–8454.

Curtis, K. et al. (2000). "High–Density, High Performance Data Storage Via Volume Holography: The Lucent Technologies Hardware Platform" In *Holographic Data Storage*. Coufal, H. J. et al. eds., Springer–Verlag., pp. 359–368.

Curtis, K. et al. (1994). "Method for Holographic Storage Using Peristorophic Multiplexing," *Opt. Lett.* 19(13):993–994.

Dhar, L. et al. (2000). "Photopolymers for Digital Holographic Data Storage"In *Holographic Data Storage*. Coufal, H. J. et al. eds., Springer–Verlag., pp. 199–208.

Gleckman, P. and Schuck, M. (Jun. 2001). "Optical Characteristicsd of a High Performance LCOS Virtual Display," Society For Information Display, *2001 International Symposium Digest of Technical Papers,* vol. XXXII, San Jose Convention Center, California, Jun. 5–7, 2001 Proc. SID International Symposium, Paper 7.1, pp. 62–65.

Hesselink, L. (2000). "Digital Holographic Demonstration Systems by Stanford University and Siros Technologies" In *Holographic Data Storage*. Coufal, H. J. et al. eds. Springer–Verlag., pp. 383–397.

Ingwall, R.T. and Waldman, D. (2000). "Photopolymer Systems" In *Holographic Data Storage*. Coufal, H. J. et al. eds., Springer–Verlag., pp. 171–197.

Jefferson, C. M. et al. (2000)."IBM Holographic Digital Data Storage Test Platforms" In *Holographic Data Storage*. Coufal, H. J. et al. eds. Springer–Verlag., pp. 369–381.

JML Optical, (2002). "Introduction to Multi–Element Systems," located at <http://www.jmlopt.com/level2?ProductiInfo/multi_element_info.aspx>, last visited on Apr. 15, 2002, 3 pages.

Mitkas, P. A. and Burr, G. W. (2000). "Volume Holographic Optical Correlators" In *Holographic Data Storage*. Coufal, H. J. et al. eds. Springer–Verlag., pp. 429–444.

Mouroulis, P. and Macdonald, J. eds.,(1997). *Geometrical Optics and Optical Design*. John Wiley and Sons, p. 162, Figure 6.25.

Pepper, D. M. et al. (Oct. 1990). "The Photorefractive Effective," *Scientific American*, 263(4):62–74.

Psaltis, D. and Mok, F. (Nov. 1995). "Holographic Memories," *Science American*,273:70–76.

Redfield, S. (2000). "Tamarack Optical Head Holographic Storage" In *Holographic Data Storage*. Coufal, H. J. et al. eds., Springer–Verlag., pp. 343–357.

Saito, K. and Horimai, H. (1998) "Holographic 3–D Disk using In–Line Face–to–Face Recording," Conference on Optical Data Storage–Topical Meeting, *Osa Technical Digest Series*, Conference Sponsor: Optical Society of America, IEEE Lasers and Electro–Optics Society SPIE, Conference Location: Aspen, CO, Conference Date: May 1998, pp. 162–164.

Smith, W. ed., (1990). "Prisms and Mirrors" In *Modern Optical Engineering: The Design of Optical Systems*. Second Edition, McGraw–Hill, p. 111.

Van Heerden, P. J. (1963)."Theory of Optical Information Storage in Solids," *Applied Optics* 2(4):393–400.

Zhou, G. et al. (2000). "Beam Deflectors and Spatial Light Modulators for Holographic Storage Application" In *Holographic Data Storage*. Coufal, H. J. et al. eds., Springer–Verlag., pp. 241–257.

\* cited by examiner

SYSTEM AND METHOD FOR HOLOGRAPHIC STORAGE WITH OPTICAL FOLDING

RELATED APPLICATIONS

This application claims the benefit of U.S. Provisional Application No. 60/358,322 filed on Feb. 19, 2002, which is incorporated by reference herein in its entirety.

TECHNICAL FIELD

The present invention relates to the general field of holographic storage systems and methods. More specifically the invention relates to a system and method for holographic storage with optical folding.

BACKGROUND

General holographic storage systems are discussed in "Holographic Memories", by Demetri Psaltis et. al., *Scientific American*, November 1995, which is hereby incorporated by reference. Holography is also discussed in the text Holographic Data Storage, by H. J. Coufal, D. Psaltis, and G. T. Sincerbox, Eds., copyright 2000, Springer-Verlag which is hereby incorporated by reference. The basic principles of holography involve the recording of an interference pattern formed between two beams of light, referred to as an object beam and a reference beam. The object beam is encoded with data in a two dimensional pattern. The reference beam is used to form the interference pattern with the encoded object beam and is subsequently used to reconstruct the data by illuminating the recorded pattern.

There are several typical holographic storage geometries and imaging systems. A Fourier-plane, or 4-F, geometry is one such imaging system, where the spatial light modulator is Fourier-transformed-onto the holographic material and the reconstruction in turn is Fourier-transformed onto the detector array. In this architecture, a first fourier transform lens of focal length $f_1$ is inserted between the spatial light modulator and the holographic storage media, and a second similar fourier transform lens of focal length $f_2$ is inserted between the holographic storage media and the detector array. The spatial light modulator and the first principal plane of the first lens are separated by a distance $f_1$, and the second principal plane of the first lens and holographic storage media are separated by a distance $f_1$. On the detector side of the storage media, the holographic storage media and the second principal plane of the second lens are separated by a distance $f_2$, and the first principal plane of the second lens and the detector array are separated by a distance $f_2$. Thus, the principal planes of the two lenses are separated by the sum of their focal lengths, with a 2-D input and output plane located one focal length in front of and behind the lens pair. The magnification of the 4-F system is given by $f_2/f_1$. 4-F systems are described in Holographic Data Storage, by H. J. Coufal, D. Psaltis, and G. T. Sincerbox, Eds., pages 28–30 and 429–431, copyright 2000, Springer-Verlag. The distance between the spatial light modulator and the first fourier transform lens, and the distance between the second fourier transform lens and the detector array is commonly referred to as the back focal length (or BFL). In certain designs, high performance fourier transform lens are utilized which operate with a high modulation transfer function. Such lenses provide a high signal-to-noise ratio at the storage medium and the detector array, resulting in a lower bit error rate at readout. However, the back focal length of such lenses is large, requiring a larger physical space in prior art 4-F systems.

Figure 10:
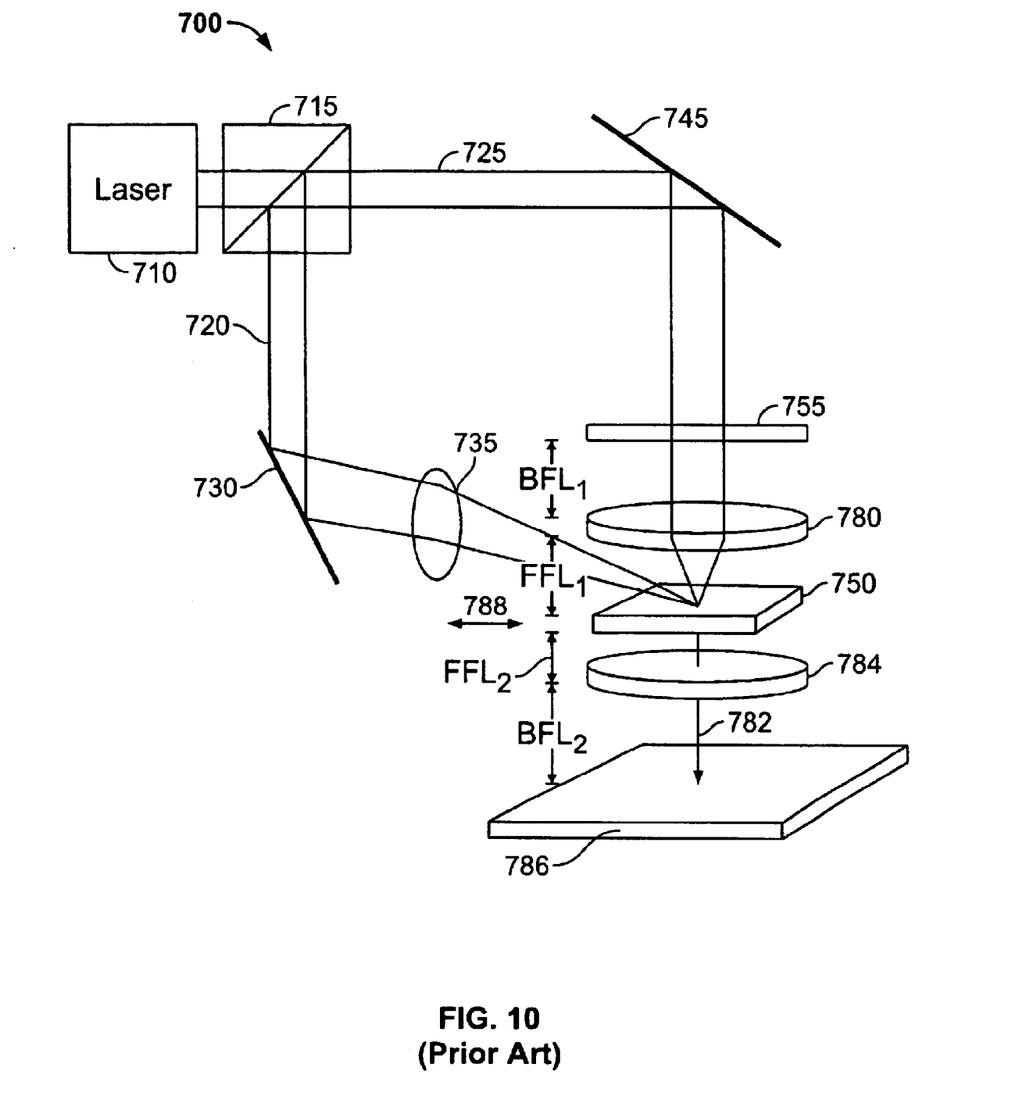
FIG. 10 illustrates the basic setup of a typical prior art 4-F holographic system.

FIG. 10 illustrates the basic setup of a typical prior art 4-F holographic system. The holographic storage system 700 includes a laser light source 710. The coherent light from the laser light source 710 is split into a reference beam and an object beam. The reference beam and object beam are directed to a holographic storage medium to record and recall holographic information. Light generated by laser light source 710 is directed to a beam splitter 715, such as a beam splitter cube, which splits the light from laser light source 710 into a reference beam 720 and an object beam 725. Reference beam 720 is reflected by a turning mirror 730 to a lens 735.

Object beam 725 is directed to a turning mirror 745 which directs the object beam to a pattern encoder 755, which encodes the object beam with data. The object beam is then directed to a holographic storage media 750 with a lens 780 of focal length $f_1$. Pattern encoder 755 may be a spatial light modulator ("SLM"), or any device capable of encoding the object beam, such as a fixed mask, or other page composer. The pattern encoder 755 receives digitized data and imposes that pattern onto the object beam 725, such that the object beam 725 comprises an array of dark and light spots. The encoded object beam 725 is then directed to lens 780 that focuses the encoded object beam 725 to a particular site on the holographic storage media 750. Pattern encoder 755 is located a distance $BFL_1$, (back focal length) from lens 780, and holographic storage media 750 is located a distance $FFL_1$, (front focal length) from lens 780.

During readout of holograms previously stored in the holographic storage media 750, object beam 725 is blocked from transmission and a reference beam is projected at the same angle to the same spot on the holographic storage medium on which the desired information was previously stored. Diffraction of the reference beam with the previously stored hologram generates a reconstruction beam 782 that reconstructs the previously stored hologram. The reconstructed beam is transmitted towards imaging lens 784 directs and images the reconstruction beam onto the plane of the optical detector 786. Imaging lens 784 has a focal length $f_2$. Imaging lens 784 is located a distance $FFL_2$ from holographic storage media 750, and optical detector 786 is located a distance $BFL_2$ from imaging lens 784. Optical detector 786 may be a conventional photodiode array, charge coupled device or other suitable detector array that transforms the encoded page into digitized data.

Although the prior art 4-F holographic systems offer the ability to accurately store holograms within a holographic storage media, there are disadvantages to existing systems. Existing systems require that the pattern encoder, first fourier transform lens, holographic storage media, second fourier transform lens, and optical detector be separated by a distance approximately f, requiring a certain physical space to house the optical components. Such systems often do not fit in standard drive envelopes.

Thus, there has been a need for improvements in the design of holographic storage systems. More specifically, there has been a need for more compact holographic storage systems.

SUMMARY OF THE INVENTION

The present invention provides a solution to the needs described above through a system and method/for holographic storage with optical folding.

In a first embodiment of the invention, the invention presents a system for recording and reading out holograms in a storage medium. The system comprises a pattern encoder, a first fourier transform lens with a focal length $f_1$, a second fourier transform lens with a focal length $f_2$, a detector array, a first prism located between the pattern encoder and the first fourier transform lens, and a second prism located between the second fourier transform lens and the detector array. The optical length between the pattern encoder and the first fourier transform lens through the first prism is equal to the back focal length $BFL_1$, and the optical path length between the second fourier transform lens and the detector array through the second prism is equal to the back focal length $BFL_2$.

A further embodiment of the invention presents a method for directing an object beam in a holographic system to a storage medium. The method comprises encoding an object beam with data utilizing a pattern encoder and directing the encoded object beam to a fourier transform lens with focal length $f_1$ from the pattern encoder through a prism, where the optical path length between the spatial light modulator and the fourier transform lens through the prism is equal to back focal length $BFL_1$. The encoded object beam is then fourier transformed to a holographic storage medium located a distance equal to front focal length $FFL_1$ from the fourier transform lens.

An embodiment of the invention presents a further method for directing a reconstruction beam in a holographic system to a detector array. The method comprises directing a reconstruction beam from a holographic storage medium to a fourier transform lens with focal length $f_2$ and fourier transforming the light beam to a detector array located a distance equal to back focal length $BFL_2$ from the fourier transform lens. The light beam is directed from the fourier transform lens to the detector array through a prism, where the optical path length between the fourier transform lens and the detector array though the prism is equal to back focal length $BFL_2$.

DESCRIPTION OF THE DRAWINGS

The features and advantages of the system and method of the present invention will be apparent from the following description in which.

DETAILED DESCRIPTION OF THE PREFERRED EMBODIMENTS

The present invention provides a solution to the needs described above through a system and method for holographic storage with optical folding. The present invention utilizes optical folding to reduce the space requirements of a holographic system.

Still other embodiments of the present invention will become apparent to those skilled in the art from the following detailed description, wherein is shown and described only the embodiments of the invention by way of illustration of the best modes contemplated for carrying out the invention. As will be realized, the invention is capable of modification in various obvious aspects, all without departing from the spirit and scope of the present invention. Accordingly, the drawings and detailed description are to be regarded as illustrative in nature and not restrictive.

Figure 1:
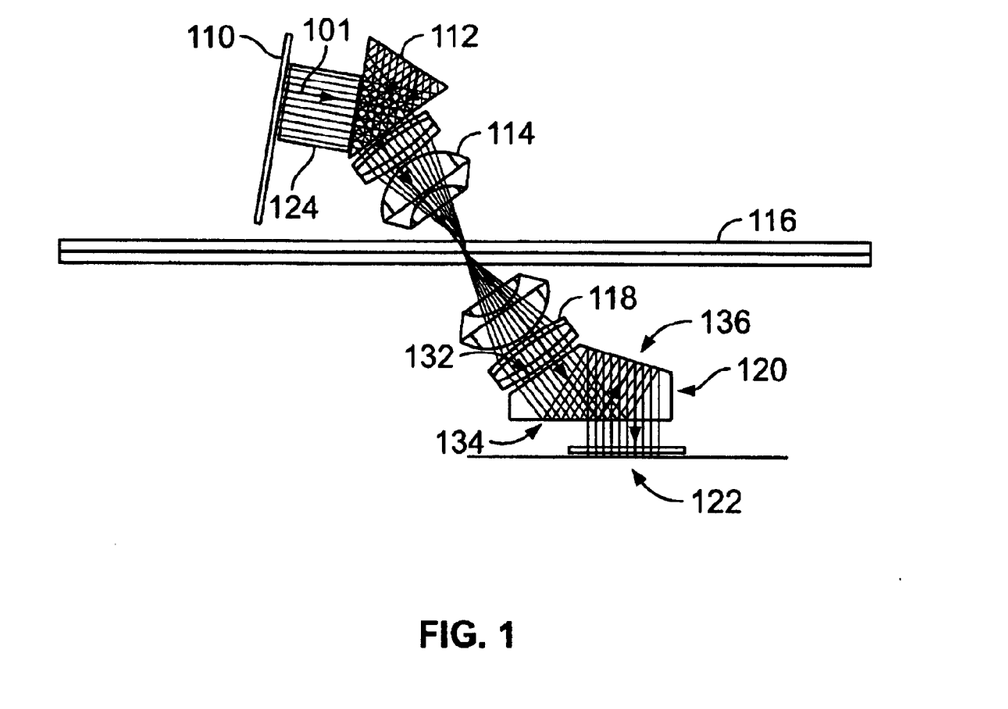
FIG. 1 illustrates an embodiment of the invention for holographic storage with optical folding.

Referring to FIG. 1, a diagram of a basic configuration utilizing an embodiment of the invention for holographic storage with optical folding is shown. In an embodiment of the invention, the invention relates to the design of the object arm of a 4-F holographic data storage system. In particular, the invention describes the precision folding of the optical path between an input device (a pattern encoder, such as a spatial light modulator, or SLM) and the first Fourier Transform (FT) lens, and between the second FT lens and the output device (a detector array, such as an electronic camera). In addition to folding the optical path, the invention describes how polarization is controlled into and out of the SLM. The object arm comprises an illumination path through which an unencoded object beam is directed that provides the polarization control function and directs the beam to a SLM for encoding, and an imaging path that images the diffracted orders of the SLM data in the holographic media during recording and re-images the data at the detector array upon readout.

The holographic storage system of the present invention may be constructed using discrete optical components, such as lasers, lenses, prisms and mirrors. Coherent light from the laser light source is split into a reference beam and an object beam. The reference beam and object beam are directed to a holographic storage medium where they interfere to record a hologram. The laser and reference beam optics are not shown. Each hologram is often referred to as a "page," and typically comprises a two-dimensional array of data bits. Several pages can be stored at one location on the holographic storage medium utilizing multiplexing techniques. For example, the reference beam may be stepped through a series of angles to implement angle multiplexing. Angle multiplexing and other associated multiplexing techniques are discussed in Holographic Data Storage, by H. J. Coufal, D. Psaltis, and G. T. Sincerbox, Eds., pages 21–62, copyright 2000, Springer-Verlag, which is hereby incorporated by reference.

Figures 2, 3:
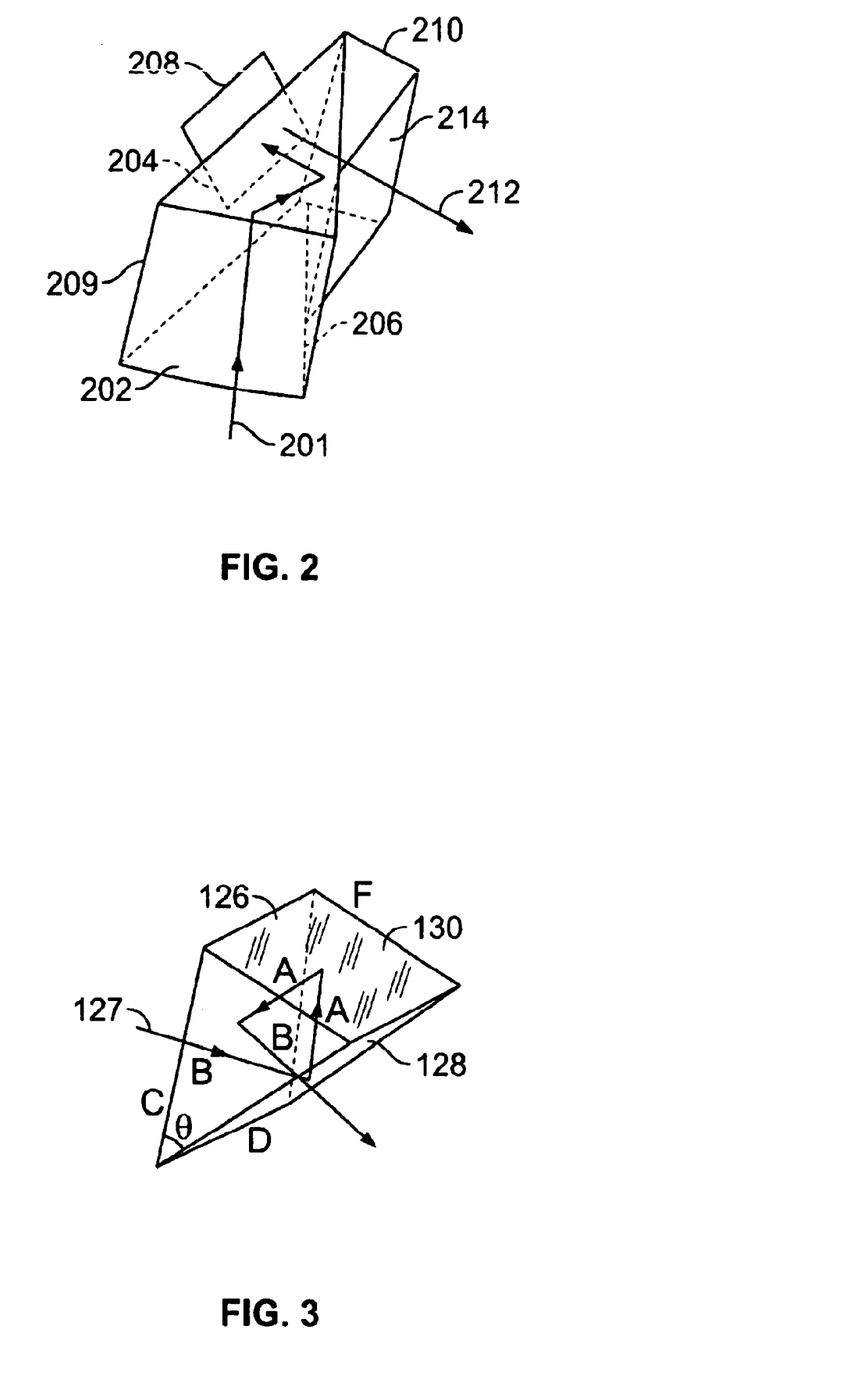
FIG. 2 illustrates an illumination prism with an attached auxiliary prism.
FIG. 3 illustrates a Schmidt prism used to optically fold an optical path.

In an embodiment of the invention, the object arm of the holographic system includes a spatial light modulator 110, a fourier transform lens 114, a prism 112 for folding the optical path length between the spatial light modulator 110 and fourier transform lens 114. In a further embodiment of the invention, as shown in FIG. 1, the holographic system illumination path comprises an illumination prism 124 located between the spatial light modulator 110 and prism 112. Referring to FIG. 2, illumination prism may also have an attached auxiliary prism. Illustrated in FIG. 1, the camera arm of the holographic system includes an imaging lens 118, a detector array 122, and a prism 120 for folding the optical path length between the imaging lens 118 and the detector array 122. Detector array 122 may be a charged coupled device or CMOS array device.

Fourier transform lens 114 and fourier transform lens 118 are similar, having focal lengths $f_1$ and $f_2$. Lens 114 and lens 118 are placed in a 4-F configuration. The principal planes of the two lenses are separated by the sum of their focal lengths, with a 2-D input and output plane located one back focal length in front of and behind the lens pair. In this architecture, a lens 114 is inserted between the spatial light modulator and the holographic storage media 116, and lens 118 is inserted between the holographic storage media 116 and the detector array 122. The optical path length between spatial light modulator 110 and lens 114 is equal to a distance $BFL_1$, and the lens 114 and holographic storage media 116 are separated by a distance $FFL_1$. On the detector side of the storage media, the holographic storage media 116 and lens 118 are separated by a distance $FFL_2$, and the optical path length between lens 118 and detector array 122 is equal to the distance $BFL_2$. In an embodiment of the invention, lens 114 and lens 118 are Fourier lenses with similar focal lengths.

During recording of holograms, light generated by a laser light source is directed to a beam splitter, such as a beam splitter cube, which splits the light from laser light source into a reference beam and an object beam 101. The reference beam is directed to the holographic storage media 116 using techniques well known to those of ordinary skill in the art. For example, the reference beam may be reflected by turning mirrors to a lens that images the reference beam onto the holographic storage media 116. The object beam 101 is directed to illumination prism 124, which directs the object beam to a pattern encoder 110, which encodes the object beam with data. Pattern encoder 110 may be a spatial light modulator ("SLM"), or any device capable of encoding the object beam, such as a fixed mask, or other page composer. In a preferred embodiment, an SLM is utilized. Such pattern encoding is typically amplitude encoding. The pattern encoder (hereinafter referred to as a SLM) 110 receives digitized data and imposes that pattern onto an object beam, such that the object beam comprises an array of dark and light spots.

In an embodiment of the invention, illumination prism 124 is a 30–60–90 degree total internal reflection (TIR) prism with polarization control. The illumination path, in this case, utilizes illumination prism 124 for folding the optical path and providing polarization control. TIR prisms are often used in microscope eyepieces to change the line of sight from vertical to 45 degrees. Such applications are discussed in Modern Optical Engineering, by Warren Smith, Second Edition, McGraw-Hill 1990, page 111, which is hereby incorporated by reference. Additionally, TIR prisms have been used in monocular and binocular headsets for illumination and polarization control of reflective LCD's. Such applications are discussed in "Optical Characteristics of a High Performance LCOS Virtual Display," Paper 7.1, Proc. SID International Symposium, June 2001, which is hereby incorporated by reference, and in U.S. Pat. No. 6,204,975, entitled "Reflective micro-display system." These headset systems require extra dielectric coatings and diachronic and/or wire-grid polarizers to control the polarization of large-angled skew rays (i.e. rays that do not lie in a plane containing the optical axis) over a large wavelength range (approximately 470–630 nm). In the holographic system case, effectively none of the rays illuminating the LCD are skew rays, and those leaving the LCD are only slightly skew, significantly simplifying the requirements of the TIR prism. Additionally, the holographic system will use one wavelength to illuminate the SLM, further simplifying the prism.

Referring to FIG. 2, further detail of illumination prism 124 is illustrated. Illumination prism 124 comprises a primary prism 209 and an auxiliary prism 210. Coated surface 206 acts as a polarizing beam-splitter. Coated surface 206 contains a dielectric coating which reflects s-polarized light and transmits p-polarized light, both with high efficiency (Rs>95%, Tp>90%), in the bandwidth of interest (e.g. 530–535 nm or 405–460 nm) at angles of incidence 20–40 degrees. Coated surface 206 is generally more efficient at reflecting s-polarized light than it is transmitting p-polarized light. In an alternative embodiment, the dielectric coating can also be replaced with a wire grid polarizer, consisting of thin wires on glass that perform the same function as the dielectric coating described above. Such wire grid polarizers are available from Moxtek Corporation. Auxiliary prism 210 is attached to the coated surface of the primary (or TIR) prism. Auxiliary prism 210 corrects for astigmatism in the imaging path introduced by the TIR prism 209. Auxiliary prism 210 and TIR prism 209 have matching indices of refraction. Auxiliary prism 210 is joined to TIR prism 209 using an optically transparent glue available from Norland Corporation. The glue has an index of refraction close to the index of refraction of TIR prism 209 and auxiliary prism 210. When joined, the auxiliary prism 210 and TIR prism 209 form a cube or rectangular structure so that the entire SLM output beam travels an equal path length through the structure. Without auxiliary prism 210, astigmatism in the SLM output occurs as a result of different portions of the SLM output travelling different path lengths in the TIR prism 209. In a further embodiment of the invention, a polarizing beam splitter cube can be used in place of the illumination prism 124.

The manner in which illumination prism 124 is used to optically fold an unencoded light beam and control polarization will now be described with reference to a light beam 201 shown in FIG. 2. Light beam 201 is linearly polarized, with polarization parallel to surface 204 (s-polarized). A rotated half-wave plate placed in the path of a laser light source and the illumination prism 124 may be utilized to achieve the desired polarization. Illumination prism 124 should be oriented with respect to light beam 201 such that light beam 201 output from a laser light source enters side 202 at an angle normal (i.e. 90 degrees) to the surface of side 202, as shown in FIG. 2. In an embodiment of the invention, the object beam is delivered along an axis near the plane of the top surface of the drive envelope. Light beam 201 proceeds through primary prism 209 until it is reflected at surface 204 due to total internal reflection. Light beam 201 remains s-polarized after reflection by surface 204 without special coatings since light beam 201 does not contain skew rays. Light beam 201 proceeds through primary prism 209 until it reaches coated surface 206. The s-polarized light component of light beam 201 is reflected by coated surface 206, and proceeds to surface 204 at an angle normal to the surface of side 204 where it exits primary prism 209 and proceeds to SLM 110.

For proper hologram recording, the bright bits of data transmitted by the illumination prism 124 and fourier transform lens 114 must have a polarization, relative to the media, that is s-polarized. Therefore the illumination prism 124 must be oriented such that the output light is s-polarized with respect to holographic storage media 116. In an embodiment of the invention, this requires the object beam to pass through the PBS coating with p-polarization (for SLM contrast) yet have s-polarization with respect to the media. The orientation of the illumination prism 124 in this embodiment satisfies both of these conditions.

SLM 208 encodes the object beam by transmitting either bright or dark bits of data to produce an encoded object beam 212. In an embodiment of the invention, a reflective type liquid crystal on silicon SLM is utilized, such as Display Tech light-caster ATV panel. For a bright bit of data (1), the SLM simultaneously reflects and rotates the polarization of the incoming light by 90 degrees (to p-polarization), and transmits it through the coated surface of the prism. For a dark bit of data (0), the SLM reflects but does not rotate the polarization of the light, and the light is reflected off the coated surface of the prism and back into the illuminator. For high SLM contrast, the more efficient s-polarization reflection is used to reject the dark bits of data out of the imaging system. In this manner, illumination prism 124 is utilized to generate high SLM contrast between dark and bright SLM outputs.

Encoded object beam 212 proceeds from SLM 208 to primary prism 209 and enters side 204 at an angle normal to the surface of side 204, as shown in FIG. 2. Light beam 212 proceeds through primary prism 209 until it reaches coated surface 206 of primary prism 209. The p-polarization component of encoded object beam 212 corresponding to bright bits of data is transmitted through coated surface 206. The s-polarization component of encoded object beam 212 corresponding to dark bits of data is reflected by coated surface 206. The p-polarization component of encoded object beam 212 proceeds through auxiliary prism 210 at an angle normal to surface 214 where it exits auxiliary prism 210 and proceeds to prism 112.

Bright bits of data from the SLM are then passed to the 4-F imaging system of the present invention. Referring to FIG. 1, for proper imaging of SLM pixels to detector array pixels (i.e. high modulation transfer function (MTF), low field curvature and low distortion), a lens 114 and lens 118 with long back focal length at the SLM and camera is preferred. However, long back focal lengths require large packaging spaces. To reduce the packaging space, the back focal lengths are optically folded using prism 112 and prism 120. Centration errors are avoided by using prisms in place of mirrors in air due to the high precision with which prism angles can be fabricated.

On the SLM side of the holographic storage media 116, in one embodiment the prism 112 is a Schmidt prism is utilized to fold the optical path. The Schmidt prism includes a first surface 126, second surface 128, and third surface 130 as shown in FIG. 3. First surface 126 has a length C and third surface 130 has a length F. First surface 126 and third surface 128 intersect at edge D, and are separated by angle θ. In one embodiment of the invention, θ is preferably between 35 to 45 degrees to allow for compact packaging. Third surface 130 is a mirrored surface. The manner in which Schmidt prism 112 is used to optically fold the light beam will now be described with reference to a light beam 127 shown in FIG. 3. Schmidt prism 112 should be oriented with respect to light beam 127 such that light beam 127 output from prism 124 enters side 126 at an angle normal (i.e. 90 degrees) to the surface of side 126, as shown in FIG. 3.

Light beam 127 proceeds through prism 112 a distance B until it is reflected 90 degrees at surface 128 due to total internal reflection and an angle of incidence of θ degrees. Light beam 127 proceeds through prism 112 a distance A until it is reflected by mirrored surface 130. Light beam 127 then proceeds a distance A until it is reflected at surface 126 due to total internal reflection. Light beam then proceeds to surface 128 a distance B at an angle normal to the surface of side 128 where it exits prism 112. In order for rays not to vignette as they travel through the prism, the index of refraction of the prism material is selected to be high. In this case, the material was chosen to be SFL57 manufactured by Schott. The Schmidt prism allows the SLM and illumination prism to be placed away from the reference beam optics, thereby avoiding mechanical interference between the two arms. Furthermore, the SLM is placed in a near-normal relationship with holographic storage media 116 so that SLM components such as thermal electric coolers are to the side of the 4-F imaging system as opposed to near the top of the drive envelope, reducing space requirements. The dimensions of Schmidt prism 112 are designed so that as a result of the three reflections, the total optical path length traveled by the object beam from the SLM 110 through the illumination prism 124 and the prism 112 to the lens 114 is equal to the back focal length $BFL_1$ of lens 114. For a required total optical path length L through the Schmidt prism 112:

L $\underline{\Delta}$ required total optical path length in Schmidt prism 112

$$L = 2A + 2B \qquad \qquad ①$$

$$A = \left(\frac{C}{2}\right) \cdot \frac{\sin(\theta)}{\sin\left(\frac{\pi}{2} - \theta\right)} \qquad \qquad ②$$

$$B = \sin\theta \cdot \left\{ C - \frac{A \cdot \sin\left(\frac{3}{2}\theta\right)}{\sin\left(\frac{\pi}{2} - \frac{\theta}{2}\right)} \right\} \qquad ③$$

Solving 3 equations (①, ②, ③) with 3 unknowns (A, B, C) produces:

$$F = A \cdot \frac{\sin\left(\frac{\pi}{2} - \theta\right)}{\sin\left(\frac{\pi}{2} - \frac{\theta}{2}\right)}$$

where C and F determine the Schmidt prism 112 dimensions.

On the detector array side of the holographic storage media 116, in one embodiment the prism 120 is a TIR prism that folds the optical path of a reconstruction beam. The TIR prism allows the camera electronics packaging to be parallel (or near parallel) to the base of the drive envelope housing the holographic system. In this embodiment, the camera package is parallel to the drive envelope, reducing space requirements and therefore allowing for a more compact drive.

Figure 4:
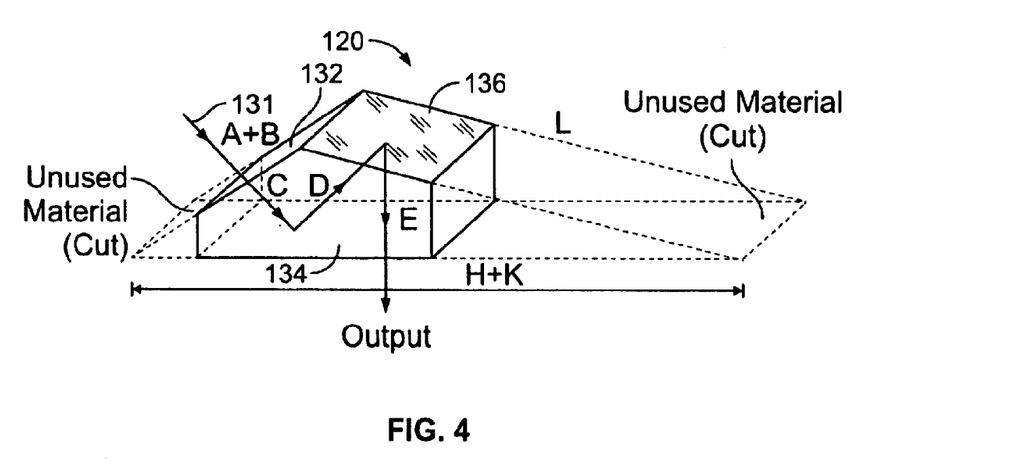
FIG. 4 illustrates a prism used to optically fold a reconstruction beam optical path.
Figure 4A:
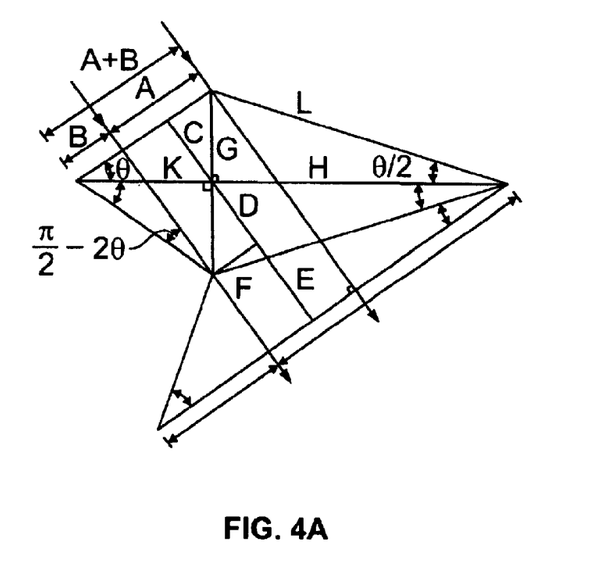
FIG. 4A is an unfolded prism diagram illustrating the prism shown in FIG. 4.

The manner in which prism 120 is used to optically fold the reconstruction beam will now be described with reference to a light beam 131 shown in FIG. 4 and FIG. 4A. FIG. 4A is an unfolded prism diagram illustrating prism 120 shown in FIG. 4. Prism 120 should be oriented with respect to light beam 131 such that light beam 131 output from lens 118 enters side 132 at an angle normal (i.e. 90 degrees) to the surface of side 132, as shown in FIG. 4. Light beam 131 proceeds through prism 120 a distance C until it is reflected at surface 134 due to total internal reflection and an angle of incidence of θ degrees. The angle of incidence is greater than the critical angle, measured with respect to the normal of surface 134, resulting in total internal reflection of light beam 131. Light beam 131 proceeds through prism 120 a distance D until it is reflected by mirrored surface 136. Light beam 131 then proceeds to surface 134 a distance E at an angle normal to the surface of side 134 where it exits prism 134. For a required total optical path length TPL through prism 120:

A $\underline{\Delta}$ required vertical clear aperture plus margin

Total Path Length TPL=C+D+E $$B = \frac{A \cdot \sin\left(\frac{\pi}{2} - \theta\right)}{1 - \sin\left(\frac{\pi}{2} - \theta\right)}$$

$$C = \left(B + \frac{A}{2}\right) \cdot \tan\theta$$

$G = (A+B) \cdot \sin\theta$ $$F = \frac{\left(\frac{A}{2}\right)}{\cos\left(\frac{\theta}{2}\right)}$$

$$D = F \cdot \frac{\sin\left(\frac{\pi}{2} - \frac{\theta}{2}\right)}{\sin\theta}$$

$$H = \frac{G}{\tan\left(\frac{\theta}{2}\right)}$$

$$E = G \cdot \frac{\left(H - \frac{A}{2}\right)}{H}$$

$$L = \frac{H}{\cos\left(\frac{\theta}{2}\right)}$$

$K = (A+B) \cdot \cos\theta$

The prism 120 dimensions are determined by (A+B), (H+K), and L. Portions of prism 120 not utilized by the optical path of light beam 131 are removed to reduce size and weight.

A high index of refraction is required to support the total internal reflection of light at such small incidence angles at the second surface. In this case, LAH78 manufactured by Hoya is used as the prism material. However, stray light from the display or media at angles of incidence lower than the critical angle have potential to pass directly to the camera, possibly degrading the image. This can be minimized by tilting the camera package, increasing the index, or changing to a lower laser wavelength.

Figure 5:
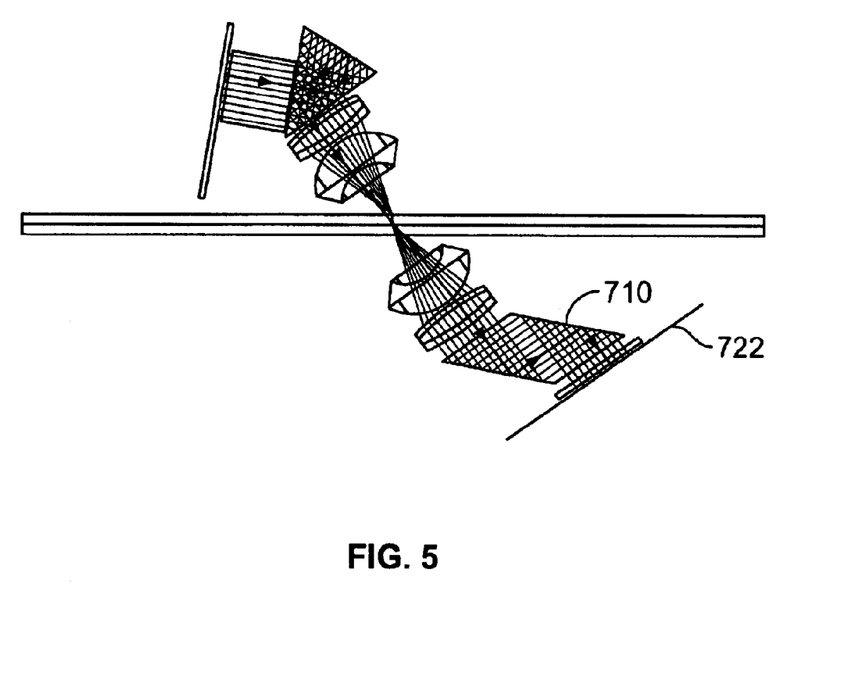
FIG. 5 illustrates a system utilizing a rhomboid prism used to optically fold a light beam the optical path.
Figure 6:
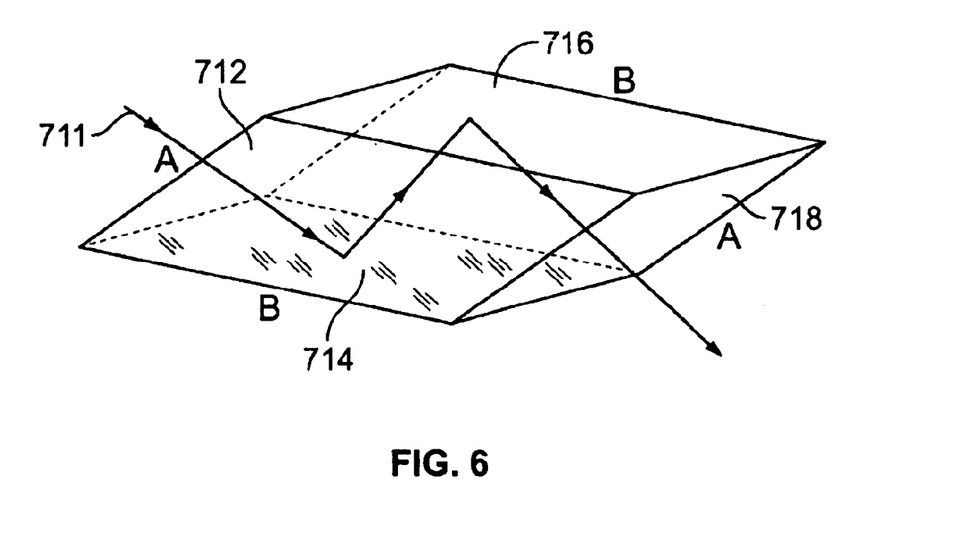
FIG. 6 illustrates the rhomboid prism shown in FIG. 5.

In an alternative embodiment, a rhomboid prism to fold the optical path. Referring to FIG. 5, a rhomboid prism 710 is used to fold the optical path. The manner in which rhomboid prism 710 is used to optically fold the reconstruction beam will now be described with reference to a light beam 711 shown in FIG. 6. Prism 710 should be oriented with respect to light beam 711 such that the light beam output from lens 118 enters side 712 at an angle normal (i.e. 90 degrees) to the surface of side 712, as shown in FIG. 6. Light beam 711 proceeds through prism 710 until it is reflected 90 degrees at mirrored surface 714 resulting from an angle of incidence of 45 degrees. Light beam 711 proceeds through prism 710 until it is reflected by mirrored surface 716. Light beam 711 then proceeds to surface 718 at an angle normal to the surface of side 718 where it exits prism 710. Light beam 711 then proceeds at normal incidence to the camera package 722, which has been appropriately positioned for normal incidence to occur.

Use of rhomboid prism 710 does not suffer potential degradation of an image due to stray light from the display or media at angles of incidence lower than the critical angle passing directly to the camera. In a further embodiment of the invention, rhomboid prism is rotated to correct image misalignments at the camera. Rotation of rhomboid prism 710 around the optical axis at the input face results in translation of the image on the camera in a direction parallel to the face of the camera. Rotation of rhomboid prism 710 about an axis parallel to the first face results in translation of the image on the camera in a direction orthogonal to the axis.

Figure 7:
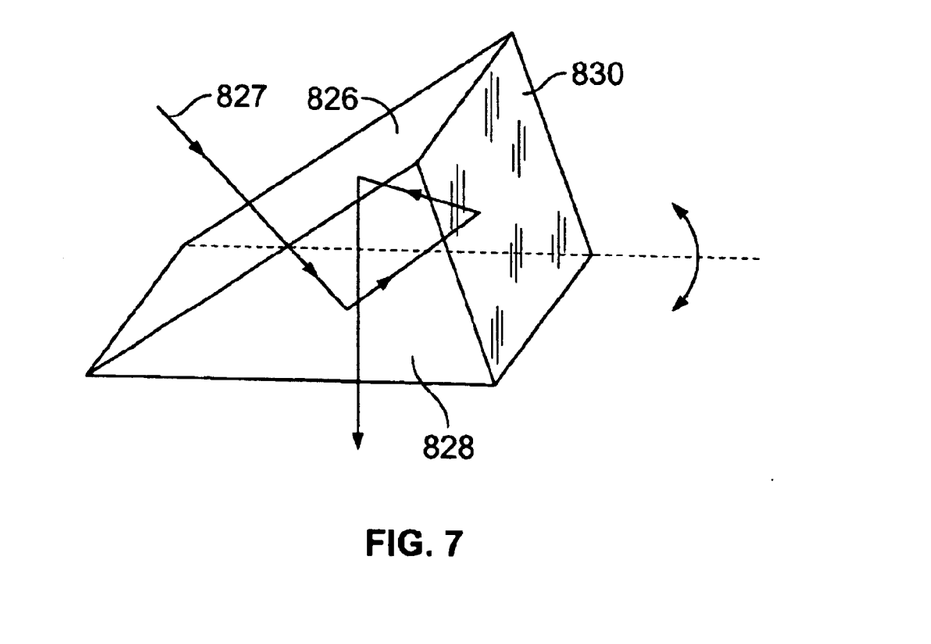
FIG. 7 illustrates a Schmidt prism used to fold an optical path.

In an alternative embodiment, a Schmidt prism to fold the optical path. Referring to FIG. 7, a Schmidt prism 810 is used to fold the optical path. The Schmidt prism has a first surface 826, second surface 828, and third surface 830. Third surface 830 is a mirrored surface. The manner in which Schmidt prism 810 is used to optically fold the reconstruction light beam will now be described with reference to a light beam 827 shown in FIG. 7. Schmidt prism 810 should be oriented with respect to light beam 827 such that light beam 827 output from lens 118 enters side 826 at an angle normal (i.e. 90 degrees) to the surface of side 826, as shown in FIG. 7. Light beam 827 proceeds through prism 810 until it is reflected 90 degrees at surface 828 due to total internal reflection and an angle of incidence of 45 degrees. Light beam 827 proceeds through prism 810 until it is reflected by mirrored surface 130. Light beam 830 then proceeds until it is reflected at surface 826 due to total internal reflection. Light beam then proceeds to surface 828 at an angle normal to the surface of side 828 where it exits prism 812. The Schmidt prism allows the camera to be placed parallel to the drive envelope, reducing space requirements. Thus, as a result of the three reflections, the total optical path length traveled by the object beam from the lens 118 through the Schmidt prism 810 to the camera is equal to the back focal length $BFL_2$ of lens 118.

In a further embodiment of the invention, Schmidt prism 810 is rotated about the optical axis to produce rotation of the image on the camera, allowing for correction of image misalignments or rotation errors in the image at the camera. Translation of the Schmidt prism 810 along an axis parallel to the plane of incidence with respect to surface 828 results in translation of the image on the camera in a direction parallel to the face of the camera.

All of the imaging system light beam folds occur in the plane of incidence with respect to the holographic storage media 116. Folding in the plane of incidence avoids interference with the mechanical hub required for rotating the media. Additionally, by placing the imaging and reference arms in the same plane of incidence, storage density in a disk is increased. The folding and rectangular modifications to the lenses allow for this increased storage density.

Figure 8:
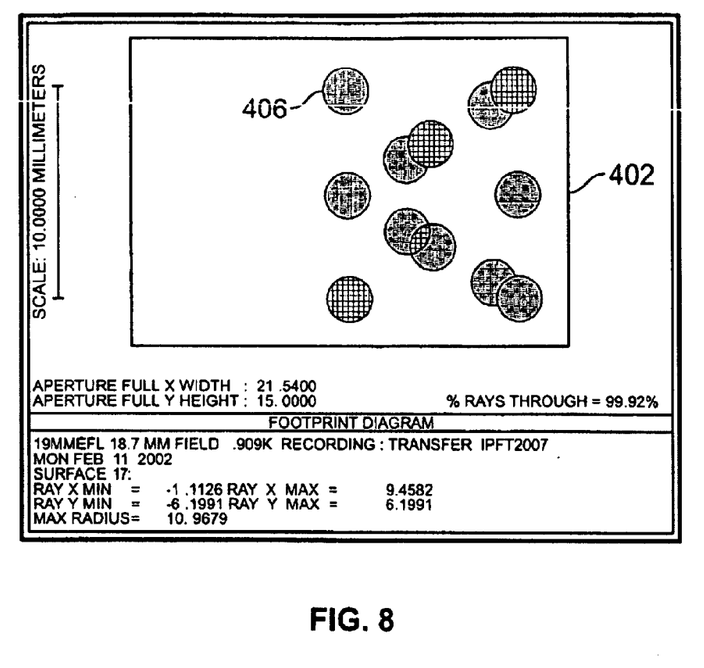
FIG. 8 illustrates simulation results of an SLM output beam and rectangular ruled aperture lens.
Figure 9:
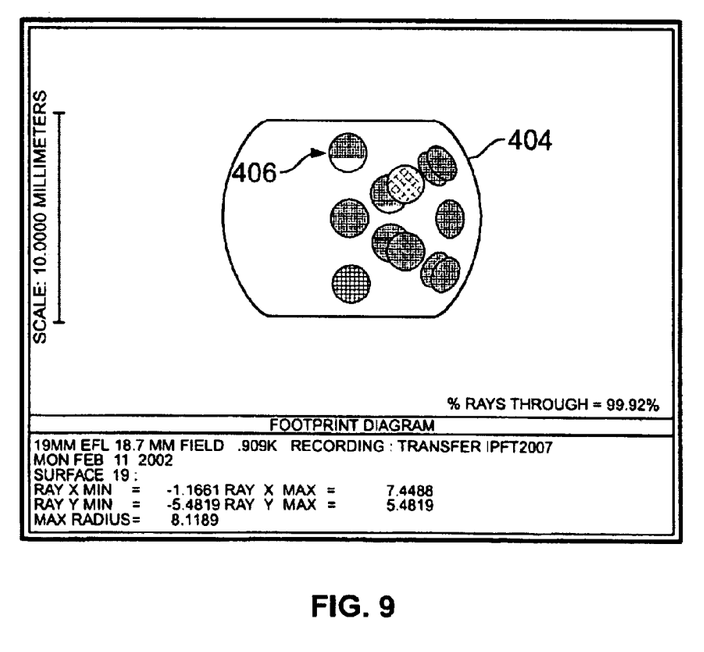
FIG. 9 illustrates simulation results of SLM output beam and ruled lens physical aperture.

In a further embodiment of the invention, fourier transform lens 114 and lens 118 are modified to either a rectangular lens aperture or a ruled lens physical aperture. Lens 114 and lens 118 can be modified by milling the lens edges. Such modification provides additional packaging room by reducing the physical size of the lens. In an embodiment of the invention, SLM 110 has a rectangular active area with aspect ratio of 10:6. The holographic system is configured so that a long axis of the SLM 110 is parallel to the plane of the holographic storage media 116 media (landscape mode) instead of the short axis (portrait mode). In such a configuration, fourier transform lens 114 and 118 are cut with rectangular or ruled clear apertures and oriented such that they provide more clearance from holographic storage media 116. Referring to FIG. 8, a rectangular aperture 402 is shown. Referring to FIG. 9, a ruled lens physical aperture 404 is shown. Illustrated in FIGS. 8 and 9 are simulation results of SLM output beams 406 mapping the clear aperture to determine the smallest physical aperture that can be implemented so that all possible beams will pass through the lens. The extra clearance provides additional space for packaging the mechanical lens housings and space for the reference beam optics. In addition, the additional space allows for larger scan beam angles during multiplexing, yielding higher storage densities.

Having described the invention in terms of a preferred embodiment, it will be recognized by those skilled in the art that various types of general purpose optical hardware may be substituted for the configuration described above to achieve an equivalent result. For example, the embodiments discussed herein include descriptions of particular optical elements. It will be apparent to those skilled in the art that modifications and variations of the preferred embodiment are possible, and that other optical elements may be used to perform equivalent functions, all of which fall within the true spirit and scope of the invention as measured by the following claims.

What is claimed is:

1. A system for recording and reading out holograms in a storage medium comprising:
    a pattern encoder;
    a first fourier transform lens with a focal length $f_1$;
    a second fourier transform lens with a focal length $f_2$;
    a detector array;
    a first prism located between the pattern encoder and the first fourier transform lens, wherein the optical length between the pattern encoder and the first fourier transform lens through the first prism is equal to a back focal length $BFL_1$; and
    a second prism located between the second fourier transform lens and the detector array, wherein the optical path length between the second fourier transform lens and the detector array through the second prism is equal to a back focal length $BFL_2$.

2. The system of claim 1, further comprising a third prism located between the pattern encoder and the first prism, wherein the optical path length between the pattern encoder and the first fourier transform lens through the third prism and the first prism is equal to a back focal length $BFL_1$.

3. The system of claim 2, wherein the third prism comprises:
    a primary prism for receiving an unencoded light beam and directing the light beam to the pattern encoder; and
    an auxiliary prism bonded to the primary prism, wherein a portion of the bonded primary prism and auxiliary prism form a cube or rectangular shape.

4. The system of claim 3, wherein the primary prism comprises a surface which acts as a polarizing beam-splitter.

5. The system of claim 3, wherein the primary prism is a total internal reflection prism.

6. The system of claim 4, wherein the surface contains a dielectric coating which reflects s-polarized light and transmits p-polarized light.

7. The system of claim 4, wherein the surface contains a wire grid polarizer.

8. The system of claim 3, wherein the primary prism and the auxiliary prism have the same index of refraction.

9. The system of claim 3, wherein the primary prism and auxiliary prism are bonded with an optically transparent glue.

10. The system of claim 1, wherein the optical path between the pattern encoder and the first fourier transform lens is folded in the first prism, and the optical path between the second fourier transform lens and the detector is folded in the second prism.

11. The system of claim 1, wherein the second prism is a total internal reflection prism.

12. The system of claim 1, wherein the second prism is a rhomboid prism.

13. The system of claim 12, wherein the rhomboid prism is rotated to correct for translation errors in the image at the detector array.

14. The system of claim 1, wherein the first prism is a Schmidt prism.

15. The system of claim 1, wherein the second prism is a Schmidt prism.

16. The system of claim 15, wherein the Schmidt prism is rotated to correct for rotation errors in the image at the detector array.

17. The system of claim 1, wherein the first fourier transform lens and the second fourier transform lens are in a 4-F configuration, separated by the sum of a front focal length $FFL_1$ and a front focal length $FFL_2$.

18. The system of claim 1, wherein the pattern encoder comprises a spatial light modulator.

19. The system of claim 1, wherein the detector comprises a charge coupled device.

20. The system of claim 1. wherein the detector comprises a CMOS detector array.

21. The system of claim 1, wherein the first fourier transform lens or the second fourier transform lens have a rectangular lens aperture or a ruled lens physical aperture, allowing for larger scan beam angles.

22. A method for directing an object beam in a holographic system to a storage medium comprising:
    encoding an object beam with data utilizing a pattern encoder;
    directing the encoded object beam to a fourier transform lens with focal length $f_1$ from the pattern encoder through a prism, wherein the optical path length between the the pattern encoder and the fourier transform lens through the prism is equal to a back focal length $BFL_1$;
    fourier transforming the encoded object beam to a holographic storage medium located a distance equal to a front focal length $FFL_1$ from the fourier transform lens.

23. The method of claim 22 further comprising, prior to encoding the object beam:
    directing an object beam to the pattern encoder through an illumination prism, wherein the illumination prism folds the optical path of the beam to direct the object beam to the pattern encoder, and wherein the illumination prism controls the polarization of the object beam received by the pattern encoder.

24. The method of claim 22 wherein the pattern encoder rotates the polarization of the object beam for a bright bit of data, wherein the encoded object beam transmits through the illumination prism to the fourier transform lens for a bright bit of data, and wherein the pattern encoder does not rotate the polarization of the object beam for a dark bit of data, wherein the encoded object beam does not transmit through the illumination prism to the fourier transform lens for a dark bit of data.

25. The method of claim 22, wherein the optical path length through the prism is equal to the sum of the optical path length of the object beam traveling from a first surface of the prism to a second surface of the prism, a second surface to a third surface of the prism, the third surface back to the second surface, wherein the object beam totally internally reflects from the second surface, and the second surface back to the third surface.

26. The method of claim 22, wherein the encoded object beam is s-polarized relative to the holographic storage medium.

27. A method for directing a reconstruction beam in a holographic system to a detector array comprising:

directing a reconstruction beam from a holographic storage medium to a fourier transform lens with focal length $f_2$; and     fourier transforming the light beam to a detector array located a distance equal to a back focal length $BFL_2$ from the fourier transform lens, wherein the light beam is directed from the fourier transform lens to the detector array through a prism, wherein the optical path length between the fourier transform lens and the detector array though the prism is equal to a back focal length $BFL_2$.

28. The method of claim 27, wherein the optical path length through the prism is equal to the sum of the optical path length travelling from a first surface of the prism to a total internal reflection second surface, the total internal reflection second surface to a third surface, and the third surface back to the total internal reflection second surface, wherein the angle of incidence from the third surface to the total internal reflection second surface is lower than the critical angle.

29. The method of claim 28, wherein the optical path length through the prism is equal to the sum of the optical path length of a light beam travelling from a first surface of the prism to a second surface, the second surface to a third surface, and the third surface to a fourth surface.

\* \* \* \* \*